United States Patent
Sun

(10) Patent No.: US 9,414,437 B2
(45) Date of Patent: Aug. 9, 2016

(54) RADIO DEVICE AND METHOD FOR MANUFACTURING THE RADIO DEVICE

(75) Inventor: Xuejun Sun, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 129 days.

(21) Appl. No.: 14/008,514

(22) PCT Filed: Mar. 28, 2011

(86) PCT No.: PCT/CN2011/000526
§ 371 (c)(1),
(2), (4) Date: Sep. 27, 2013

(87) PCT Pub. No.: WO2012/129718
PCT Pub. Date: Oct. 4, 2012

(65) Prior Publication Data
US 2014/0024413 A1    Jan. 23, 2014

(51) Int. Cl.
*H04W 88/08* (2009.01)
*H04B 1/3816* (2015.01)
*H04B 1/036* (2006.01)
*H04B 1/08* (2006.01)
*H04B 1/38* (2015.01)

(52) U.S. Cl.
CPC .............. *H04W 88/08* (2013.01); *H04B 1/3816* (2013.01); *H04W 88/085* (2013.01); *H04B 1/036* (2013.01); *H04B 1/08* (2013.01); *H04B 2001/3894* (2013.01)

(58) Field of Classification Search
None
See application file for complete search history.

(56) References Cited

U.S. PATENT DOCUMENTS

| 6,041,035 | A  | * | 3/2000  | Thedens      | 370/217   |
|-----------|----|---|---------|--------------|-----------|
| 6,411,825 | B1 |   | 6/2002  | Csapo et al. |           |
| 6,865,401 | B2 | * | 3/2005  | Kotzin       | 455/557   |
| 7,171,237 | B2 | * | 1/2007  | Vangala      | 455/557   |
| 7,200,229 | B2 | * | 4/2007  | Spring et al.| 380/52    |
| 8,140,005 | B2 | * | 3/2012  | Runyon et al.| 455/12.1  |
| 8,318,546 | B2 | * | 11/2012 | Lima         | 438/122   |
| 8,583,100 | B2 | * | 11/2013 | Koziy        | H04W 88/085 370/315 |
| 8,737,454 | B2 | * | 5/2014  | Wala         | H04B 1/18 375/220   |

(Continued)

FOREIGN PATENT DOCUMENTS

CN    201004635 Y    1/2008
EP    1404024 A2    3/2004

(Continued)

OTHER PUBLICATIONS

International Search Report, Application No. PCT/CN2011/000526, Jan. 12, 2012, 2 pages.

(Continued)

*Primary Examiner* — Tuan A Tran
(74) *Attorney, Agent, or Firm* — Nicholson De Vos Webster & Elliott LLP

(57) ABSTRACT

The present invention relates to a radio device including a first mother unit for providing fundamental functions for the radio device, a first receiving unit for receiving signals and a first transmitting unit for transmitting signals. Each of the first mother unit, the first receiving unit and the first transmitting unit is a modularly designed unit such that it can be replaced with a corresponding second mother unit, second receiving unit or second transmitting unit. The radio device according to the present invention has the beneficial effect of facilitating scalability and being capable of reducing the maintenance costs.

17 Claims, 5 Drawing Sheets

(56) References Cited

U.S. PATENT DOCUMENTS

| | | | |
|---|---|---|---|
| 8,977,327 B2* | 3/2015 | Yokoyama | 455/575.1 |
| 2004/0204028 A1* | 10/2004 | Kotzin | 455/551 |
| 2009/0163146 A1* | 6/2009 | Yokoyama | 455/73 |

FOREIGN PATENT DOCUMENTS

| | | |
|---|---|---|
| EP | 1404024 A3 | 3/2004 |
| WO | WO-0106801 A1 | 1/2001 |
| WO | WO-2010145461 A1 | 12/2010 |

OTHER PUBLICATIONS

Written Opinion of the International Searching Authority, Application No. PCT/CN2011/000526, Jan. 12, 2012, 10 pages.
International Preliminary Report on Patentability, Application No. PCT/CN2011/000526, Jun. 27, 2013, 15 pages.
Extended European Search Report and Written Opinion, Application No. 11862596.1, dated Jul. 31, 2014, 6 pages.

* cited by examiner

RADIO DEVICE AND METHOD FOR MANUFACTURING THE RADIO DEVICE

CROSS-REFERENCE TO RELATED APPLICATIONS

This application is a National stage of International Application No. PCT/CN2011/000526, filed Mar. 28, 2011, which is hereby incorporated by reference.

FIELD OF THE INVENTION

The present invention in general relates to a radio device in the communication system. The present invention also relates to a method for manufacturing the radio device.

BACKGROUND OF THE INVENTION

For the convenience of maintenance, base station in recent years usually comprises a proximal end, i.e., a main unit (MU) or a base band unit (BBU); and a distal end, i.e., a remote radio unit (RRU). The two portions are connected via fibers. The MU can be mounted at an appropriate machine room position, and the RRU is mounted at the antenna end (the distal end). In this way, the previous integral base station can be divided into two portions separated from each other, and the fussy maintenance work can be simplified. One MU can be connected to multiple RRUs, which not only saves the machine room space but also reduces the maintenance cost, and increases networking efficiency. 3G network uses larger amount of distributed base station frameworks and adopts multi-channel schemes of MU+RRU, so that large area of indoor coverage can be primly achieved.

However, the RRUs in the current market are all integrally manufactured in the form of a single piece as shown in FIG. 1 exemplarily, wherein a heat sink structure 14 serves as a casing for accommodating a filter unit 13 and several radio printed circuit boards (PCB) 11, 12 therein integrally so as to provide environmental protection for all these components. Thus, when one component of the RRU needs replacing due to malfunction or needs updating for technical upgrade or parameter adjustment, only the entire RRU can be replaced by another RRU integrally, instead of only partially replacing one or more of the filter unit 13 and the radio PCBs 11, 12 of the RRU that need replacing.

The current RRU providers mostly pay their attention to how to divide these components within the heat sink structure and arrange them compactly within the heat sink structure, while ignoring the future scalability of the RRU, maintenance costs and so on. Hence, it is desiderated to improve the current RRU structure design.

SUMMARY OF THE INVENTION

One object of the present invention is to provide a modularly designed radio device which facilitates scalability and can reduce the maintenance costs.

In order to achieve this object, the present invention provides a radio device, comprising:
a first mother unit for providing fundamental functions for the radio device;
a first receiving unit for receiving signals; and
a first transmitting unit for transmitting signals,
wherein at least one of the first mother unit, the first receiving unit and the first transmitting unit is a modularly designed unit such that it can be replaced with a corresponding second mother unit, second receiving unit or second transmitting unit.

Because the at least one of the first mother unit, the first receiving unit and the first transmitting unit of the radio device is a modularly designed unit such that it can be replaced with a corresponding second mother unit, second receiving unit or second transmitting unit, the radio device according to the present invention has the beneficial effect of facilitating scalability and being capable of reducing the maintenance costs.

According to one aspect of the present invention, the radio device is a remote radio unit.

According to another aspect of the present invention, the modularly designed unit comprises a heat sink structure capable of being replaced together with the modularly designed unit.

According to yet another aspect of the present invention, function parameters of the corresponding second mother unit, second receiving unit or second transmitting unit are the same as or partially different from or completely different from function parameters of the first mother unit, the first receiving unit or the first transmitting unit.

The present invention also provides a radio device comprising two or more modularly designed units, each of the units providing different predetermined functions, and each of the units comprising a heat sink structure capable of being replaced together with the unit. The two or more units may be a mother unit for providing fundamental functions for the radio device, a receiving unit for receiving signals and a transmitting unit for transmitting signals. The radio device may be a remote radio unit.

The present invention also provides a base station comprising the radio device mentioned above.

The present invention also provides a method for manufacturing a radio device including two or more units, comprising the steps of:
modularly designing each of the two or more units such that it can be replaced independently; and
assembling the two or more units together to form the radio device.

The radio device according to the method may be a remote radio unit; each of the modularly designed units may comprise a heat sink structure capable of being replaced together with the modularly designed unit; and the two or more units may be a mother unit for providing fundamental functions for the radio device, a receiving unit for receiving signals and a transmitting unit for transmitting signals. The radio device may be a remote radio unit.

Other objects, advantages, and novel features of the present invention will be apparent from the following detailed description thereof with reference to the attached drawings, in which:

DETAILED DESCRIPTION OF THE PRESENT INVENTION

Since the technology is improved from time to time, there will always be new things such as higher output power, higher information bandwidth (IBW), better sensitivity, more carriers/data throughput and/or more transmitting/receiving branches to make RRU better. The prior art RRU structure is just a whole unit, which is customized for one specific market. Even if the internal blocks can be built with modular concept, the final assembled RRU is still one entity to design and test. Nothing can be changed, and nothing is scalable. Therefore, one RRU can only meet one specific configuration/functionality requirement, for example, 60 W output power, 1 transmitter (TX), 2 receivers (RX), 4 carriers; these requirements will get out with one completely customized RRU product, instead of combination of different modules.

With this limitation, it takes quite long time to develop new RRU for a new radio frequency band, new power class, and more TX/RX branches. The prior art architecture is not really modular design.

If a RRU with 60 W output power is redesigned as 120 W output power, nothing can be done except exchanging the whole RRU product. From design aspect, for each kind of configuration (such as 1TX/2RX/60 W), one specific RRU must be redesigned and retested.

The main idea of the present invention is to make RRU design scalable and modular. The whole RRU will be constructed by one or more functional modules. Each functional module can be designed and tested by itself and be fully outdoor environmental protected. From modular design aspect, RRU can be built by assembling different function modules, with all kinds of combinations. From scalability design aspect, RRU can be extended or scaled by replacing original modules with new modules with better performance/functionality. For instance, the RRU may comprise several functional units such as a mother unit, a receiving unit and a transmitting unit and a heat sink structure, wherein the mother unit is namely a unit for providing fundamental functions (such as power supply function, control function and interface function) for the entire RRU. The mother unit generally comprises various interfaces (such as fiber interface, power source interface and human-machine interface), digital circuits (such as CPU, FPGA and ASIC) and power sources and so on. These functional units are usually represented specifically in the form of PCB.

The spirit of the present invention will be detailedly described hereafter with reference to the attached drawings.

Figure 1:
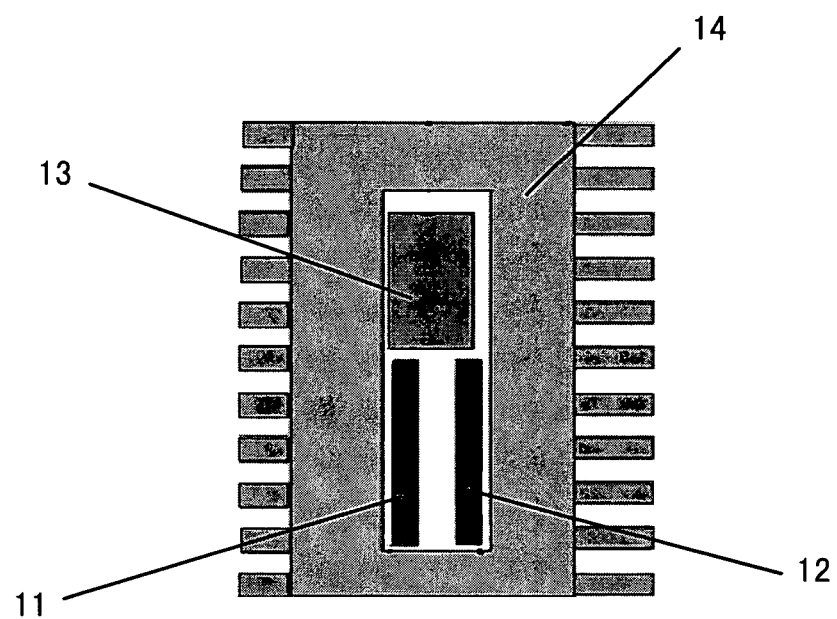
FIG. 1 is a schematic view of a radio device in the prior art.
Figure 2:
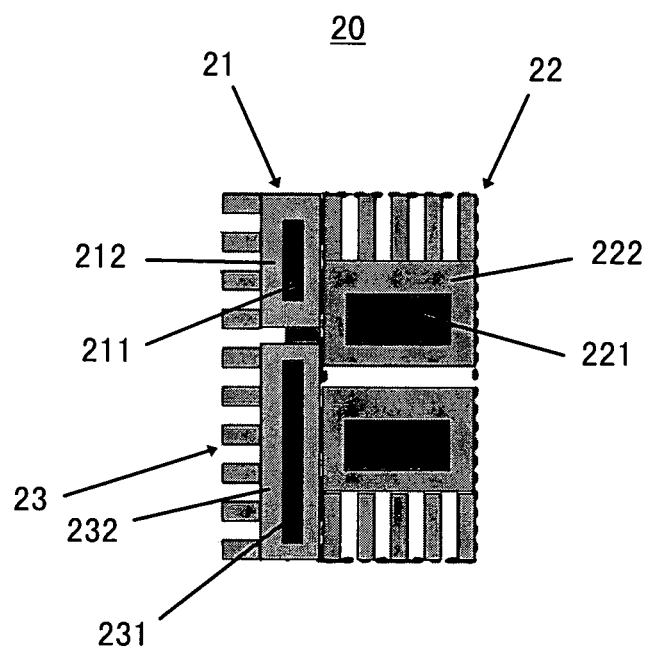
FIG. 2 is a schematic view of a radio device according to one embodiment of the present invention.

FIG. 2 is a schematic view of a radio device 20 according to one embodiment of the present invention. The radio device 20 includes a first mother unit 23 with a PCB 231 for providing fundamental functions for the radio device 20, a first receiving unit 21 with a PCB 211 for receiving signals and a first transmitting unit 22 with a PCB 221 for transmitting signals, wherein the first mother unit 23, the first receiving unit 21 and the first transmitting unit 22 are all modularly designed units such that they can be replaced with a corresponding second mother unit (not shown), a corresponding second receiving unit (not shown) and a corresponding second transmitting unit (not shown) respectively.

Moreover, though the first mother unit 23, the first receiving unit 21 and the first transmitting unit 22 in the embodiment shown here are all modularly designed units, it should be appreciated that the first mother unit 23, the first receiving unit 21 and the first transmitting unit 22 can be designed independently such that only one or two units is modularly designed.

Because the at least one of the first mother unit 23, the first receiving unit 21 and the first transmitting unit 22 of the radio device 20 is a modularly designed unit such that it can be replaced with a corresponding second mother unit, second receiving unit or second transmitting unit, the radio device according to the present invention has the beneficial effect of facilitating scalability and being capable of reducing the maintenance costs.

Each of the modularly designed units 23, 22, 21 comprises a heat sink structure 232, 222, 212 capable of being replaced together with the respective modularly designed units 23, 22, 21. The heat sink mechanical structures 232, 222, 212 each works as an "enclosure" to keep the corresponding PCB inside for environmental protection. The heat sink structures 232, 222, 212 have cooling fins (not labeled) respectively to speed up cooling. It should be noted that, for the purposes of brevity, descriptions of well-known components or measures (for instance, the first transmitting unit 22 may have a power amplifier, a filter element and so on; the first receiving unit 21 may have a low noise amplifier (LNA), a receiver intermediate frequency (RX IF) element and so on; and the first mother unit 23 may have a interface, a digital circuit, a power controller and so on) have been omitted.

Figure 3:
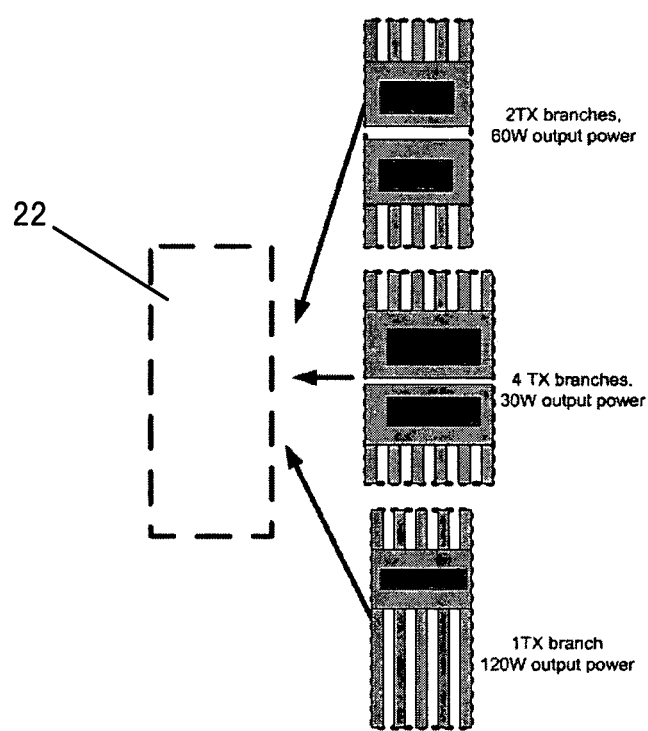
FIG. 3 schematically shows replacement methods of a receiving unit of the radio device in FIG. 2.
Figure 4:
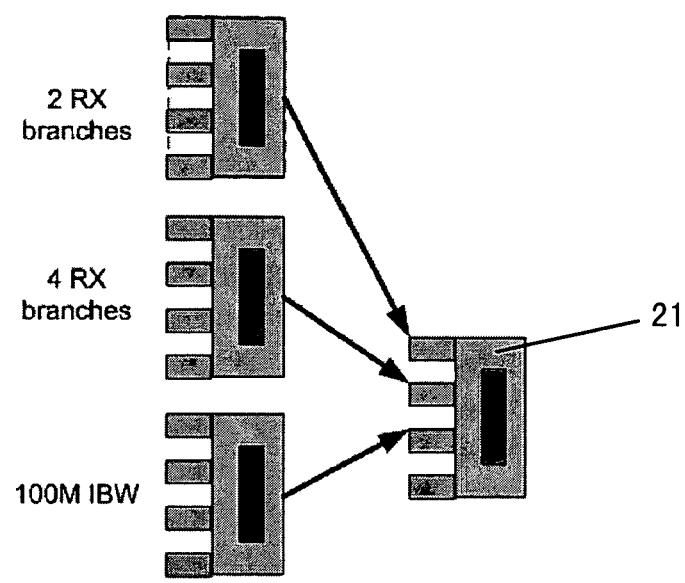
FIG. 4 schematically shows replacement methods of a transmitting unit of the radio device in FIG. 2.
Figure 5:
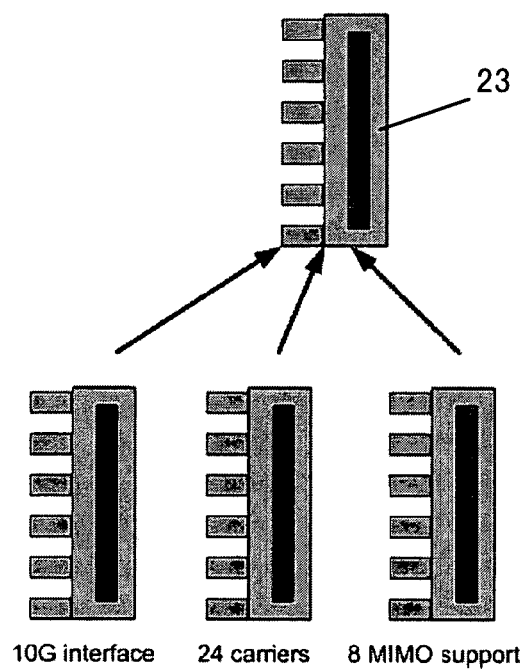
FIG. 5 schematically shows replacement methods of a mother unit of the radio device in FIG. 2.

FIGS. 3-5 schematically show the detailed replacement methods of the modularly designed units 23, 22, 21 of the radio device 20 in FIG. 2, respectively. In particular, the given first transmitting unit 22 of FIG. 3 can be replaced with a second transmitting unit having 2 TX branches and 60 W output power, 4 TX branches and 30 W output power or 1 TX branch and 120 W output power. The given first receiving unit 21 of FIG. 4 can be replaced with a second receiving unit having 2 RX branches, 4 RX branches or 100M bandwidth. The given first mother unit 23 of FIG. 5 can be replaced with a second mother unit having an interface of 10 Gbit/sec data transmission rate, 24 carriers or 8 Multiple-Input Multiple-Output (MIMO) structure. Function parameters (such as output power, data throughput, TX/RX branches, sensitivity, information bandwidth and so on) of the second mother unit, the second receiving unit and the second transmitting unit may be the same as those of the first mother unit 23, the first receiving unit 21 and the first transmitting unit 22 (i.e., these second units are spare parts of the first units); or are partially different from them (i.e., these second units are partially upgraded units of the first units); or are completely different from them (i.e., these second units are completely upgraded units of the first units).

According to another embodiment (not shown) of this invention, the radio device may comprise two or more modularly designed units, each of the units providing different predetermined functions, and each of the units comprising a heat sink structure capable of being replaced together with the unit. The two or more units may be a mother unit for providing fundamental functions for the radio device, a receiving unit for receiving signals and a transmitting unit for transmitting signals. The radio device may be a remote radio unit.

The present invention also provides a base station (not shown) comprising the radio device mentioned above. It should be noted that there might be different names for base station in different communication systems. For example, it is called Node B in some 3G communication systems and eNode B in some 4G communication systems.

The present invention also provides a method for manufacturing the radio device, the method comprises the steps of:
modularly designing each of the two or more units such that it can be replaced independently; and
assembling the two or more units together to form the radio device.

The radio device according to the method may be a remote radio unit; each of the modularly designed units may comprise a heat sink structure capable of being replaced together with the modularly designed unit; and the two or more units may be a mother unit for providing fundamental functions for the radio device, a receiving unit for receiving signals and a transmitting unit for transmitting signals. The radio device may be a remote radio unit.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, number, and arrangement of parts within the principles of the invention to the full extent indicated by the broad general meaning of the terms in which the appended claims are expressed.

Certain specific details of the disclosed embodiment are set forth for purposes of explanation rather than limitation, so as to provide a clear and thorough understanding of the present invention. However, it should be understood by those skilled in this art, that the present invention might be practiced in other embodiments that do not conform exactly to the details set forth herein, without departing significantly from the spirit and scope of this disclosure. For instance,

- the heat sink structures shown in the figures are just for schematic purpose, instead of showing the real implementation way thereof. With the improvement of cooling technology, the first transmitting/receiving/mother unit can also be replaced by an adapted second transmitting/receiving/mother unit;
- the power class (30 W, 60 W, 120 W) in this disclosure is just an example, this invention covers all the power class conventionally used;
- when the RRU configuration is changed from 1 TX to 2TX/4TX, or higher output power class, the only thing needs to do is just to replace the transmitting unit;
- in the context of this application, the RRU is modularly divided into a mother unit, a receiving unit and a transmitting unit exemplarily, but it should be noted that this division method is just an example, this invention covers all applicable division methods used in the art. For instance, the receiving unit and the transmitting unit may be designed integrally as a transceiver, wherein the transceiver and/or the mother unit is modularly designed; and
- for the sake of clarity and brevity, we take the RRU for example and thereby provide a detailed explanation. However, it should be noted that this invention cannot be limited within the scope of RRU.

Further, in this context, and for the purposes of brevity and clarity, detailed descriptions of well-known methodologies have been omitted so as to avoid unnecessary detail and possible confusion.

The mere fact that certain measures are recited in mutually different dependent claims does not indicate that a combination of these measures cannot be used to advantage.

The invention claimed is:

1. A radio device comprising:
    a first mother unit for providing fundamental functions for the radio device, wherein the first mother unit includes a fiber interface to connect with a main unit of a base station in a mobile communication system through a fiber, and wherein the base station includes the main unit and the radio device;
    a first receiving unit for receiving signals; and
    a first transmitting unit for transmitting signals,
    wherein each of the first mother unit, the first receiving unit and the first transmitting unit is a modularly designed unit such that it can be replaced with a corresponding second mother unit, second receiving unit or second transmitting unit, and wherein each of the first mother unit, the first receiving unit and the first transmitting unit is outdoor environmental protected.

2. The radio device according to claim 1, wherein the radio device is a remote radio unit.

3. The radio device according to claim 1, wherein each of the modularly designed units comprises one heat sink structure capable of being replaced together with the modularly designed unit.

4. The radio device according to claim 1, wherein function parameters of the corresponding second mother unit, second receiving unit or second transmitting unit are the same as or partially different from or completely different from function parameters of the first mother unit, the first receiving unit or the first transmitting unit.

5. A base station, in a mobile communication system, comprising:
    a main unit; and
    a radio device, the radio device including:
        a first mother unit for providing fundamental functions for the radio device, wherein the first mother unit includes a fiber interface to connect with the main unit through a fiber;
        a first receiving unit for receiving signals; and
        a first transmitting unit for transmitting signals,
        wherein each of the first mother unit, the first receiving unit and the first transmitting unit is a modularly designed unit such that it can be replaced with a corresponding second mother unit, second receiving unit or second transmitting unit, and wherein each of the first mother unit, the first receiving unit and the first transmitting unit is outdoor environmental protected.

6. A method for manufacturing a radio device, the method comprising the steps of:
    modularly designing each of a first mother unit, a first receiving unit and a first transmitting unit such that it can be replaced independently, wherein the first mother unit provides fundamental functions for the radio device, and wherein the first mother unit includes a fiber interface to connect with a main unit of a base station in a mobile communication system through a fiber, and wherein the base station includes the main unit and the radio device, the first receiving unit receives signal, and the first transmitting unit transmits signal; and
    assembling the first mother unit, the first receiving unit and the first transmitting unit together to form the radio device, wherein each of the first mother unit, the first receiving unit and the first transmitting unit is outdoor environmental protected.

7. The method according to claim 6, wherein the radio device is a remote radio unit.

8. The method for manufacturing the radio device according to claim 6, wherein each of the modularly designed units comprises one heat sink structure capable of being replaced together with the modularly designed unit.

9. The method according to claim 8, wherein the one heat sink structure containing cooling fins to speed up cooling.

10. The method according to claim 6, further comprising the step of:
    replacing one of the first mother unit, the first receiving unit, and the first transmitting unit with a corresponding second mother unit, second receiving unit or second transmitting unit.

11. The method according to claim 10, wherein function parameters of the corresponding second mother unit, second receiving unit or second transmitting unit are the same as function parameters of the first mother unit, the first receiving unit or the first transmitting unit.

12. The method according to claim 10, wherein function parameters of the corresponding second mother unit, second receiving unit or second transmitting unit are partially different from function parameters of the first mother unit, the first receiving unit or the first transmitting unit.

13. The method according to claim 10, wherein function parameters of the corresponding second mother unit, second receiving unit or second transmitting unit are completely different from function parameters of the first mother unit, the first receiving unit or the first transmitting unit.

14. The method according to claim 6, wherein the first transmitting unit has output power of one of 30, 60, and 120 Watts.

15. The method according to claim 6, wherein the first transmitting unit has at least one of a power amplifier and a filter element.

16. The method according to claim 6, wherein the first receiving unit has at least one of a low noise amplifier (LNA), a receiving intermediate frequency element.

17. The method according to claim 6, wherein the first mother unit has at least one of an interface, a digital circuit, and a power controller.

* * * * *